Aug. 11, 1942. E. O. WOELLER 2,292,810
METHOD AND APPARATUS FOR MAKING TUBE
Filed July 29, 1940 3 Sheets-Sheet 1
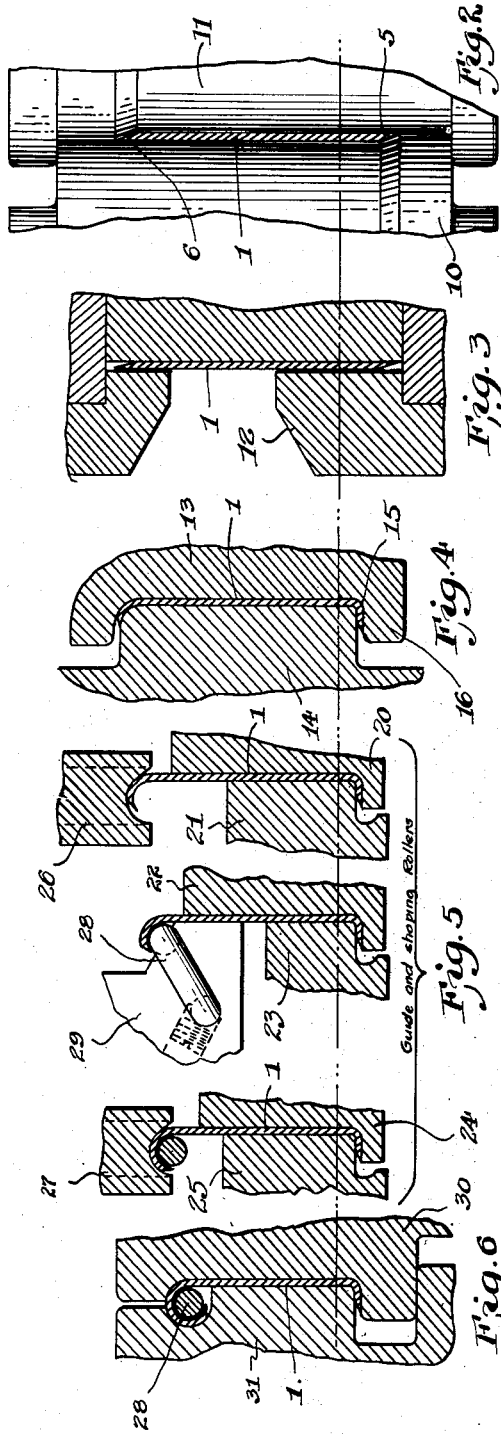
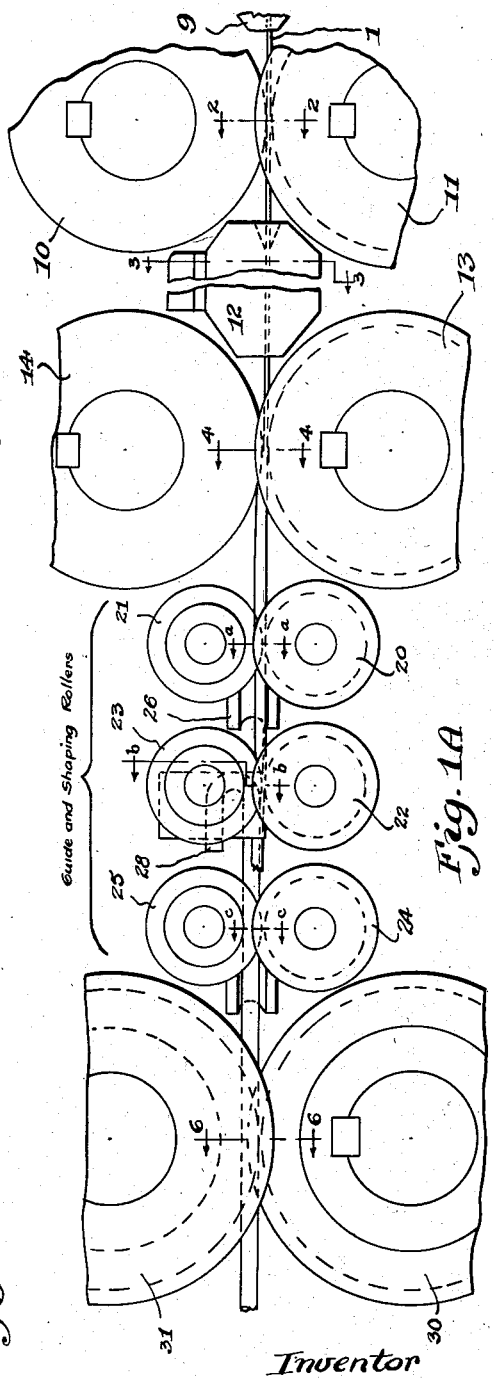
Inventor
Erich O. Woeller
By Barnes, Kisselle, Laughlin & Raisch
Attorneys.

Aug. 11, 1942.　　　E. O. WOELLER　　　2,292,810
METHOD AND APPARATUS FOR MAKING TUBE
Filed July 29, 1940　　　3 Sheets-Sheet 2
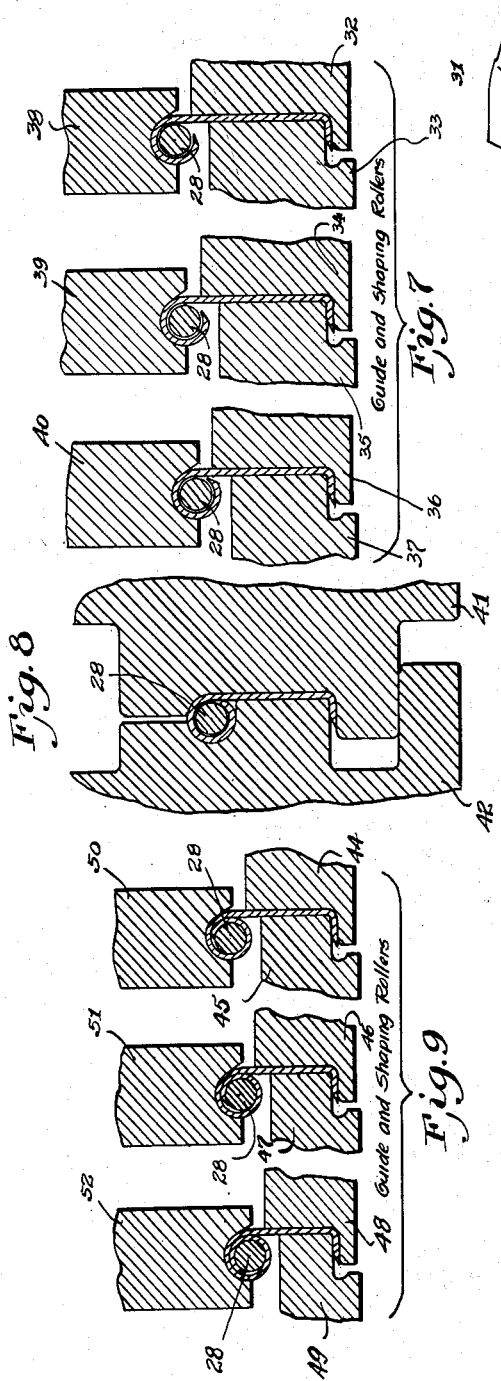
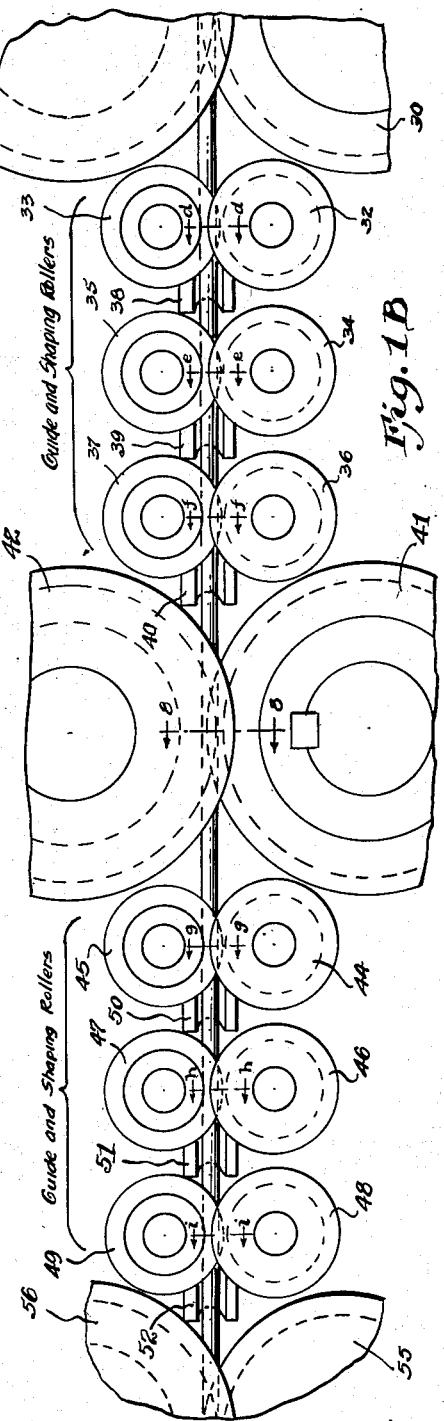
Inventor
Erich O. Woeller
By Barnes, Kisselle, Laughlin & Raisch
Attorneys.

Aug. 11, 1942.     E. O. WOELLER     2,292,810
METHOD AND APPARATUS FOR MAKING TUBE
Filed July 29, 1940     3 Sheets-Sheet 3
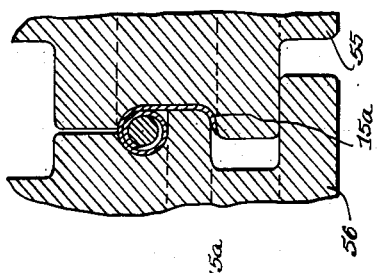
Fig. 10
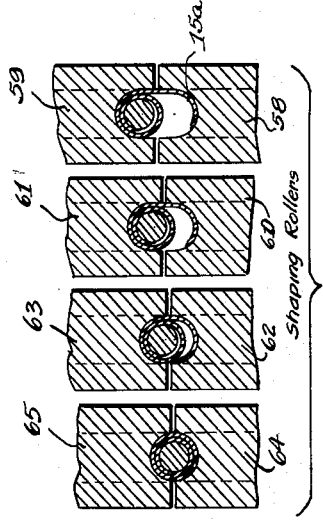
Fig. 11
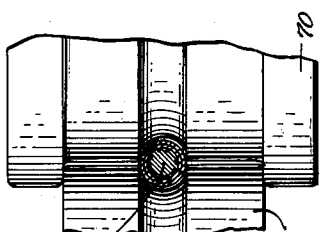
Fig. 12
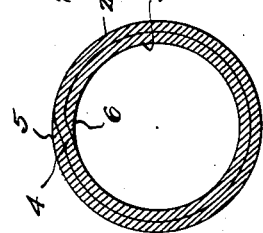
Fig. 13
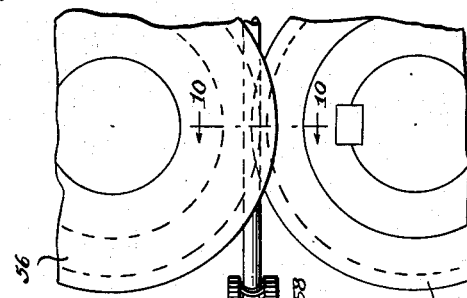
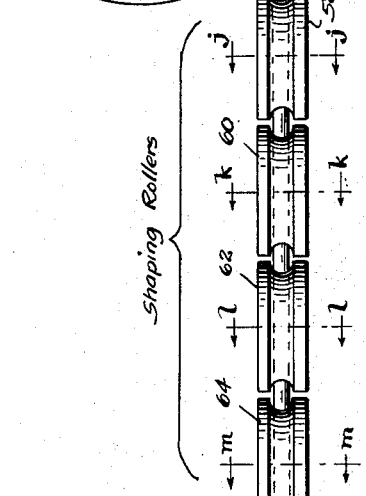
Fig. 1C
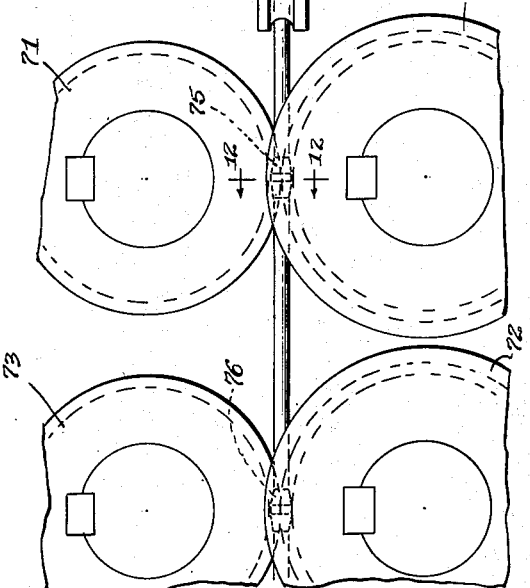
Inventor
Erich O. Woeller
By Barnes, Kisselle, Laughlin & Raisch
Attorneys Patented Aug. 11, 1942

2,292,810

UNITED STATES PATENT OFFICE 2,292,810

METHOD AND APPARATUS FOR MAKING TUBE

Erich O. Woeller, Detroit, Mich., assignor to Bundy Tubing Company, Detroit, Mich., a corporation of Michigan Application July 29, 1940, Serial No. 348,211

7 Claims. (Cl. 153—54)

This invention relates to a method and apparatus for making tubing, and it has to do particularly with the making of plural ply tubing from strip metal stock wherein the stock is fashioned into tubular form as it is moved lengthwise.

More particularly, the invention is directed to the making of plural ply tubing wherein a single strip of stock is employed. Such a tube is disclosed in the Quarnstrom Patent No. 2,014,983 of September 17, 1935. It is an object of the invention to provide an improved method and apparatus for forming the tube so that the seam structure and the plies remain in close contact with each other for a subsequent sealing of the seam and plies by a heat treatment where the sealing may be effected by a bonding metal. Thus open places or voids are minimized with resultant minimizing of scrap or defective tube. It is also an object of the invention to provide an improved method and apparatus for forming such tube where the edges of the strip are initially beveled to provide an overlapped scarfed type seam with an intervening off-set, of the type shown in the above mentioned Quarnstrom patent. To this end the invention contemplates placing an initial or preliminary formation in the strip stock which serves as a guide and a force reactance structure as the strip is fashioned. The portion of the strip thus preliminarily shaped may be then modified as to its form, so that such portion can be properly fashioned into a portion of a ply of the tube. The preliminary shape or form serves also to definitely locate the strip so that the seam in the tube is given a definite location with particular reference to the final sizing rolls in order that the greatest pressure exerted by said rolls may be applied to the seam. A structure for carrying out the invention is disclosed in the accompanying drawings.

Fig. 1A is a side elevational view showing rollers for performing initial forming operations upon the strip.

Fig. 1B is a side elevational view continuing from Fig. 1A showing a group of rollers for performing succeeding operations upon the strip.

Fig. 1C is a continuation of Figs. 1A and 1B showing other rollers for performing final forming operations on the strip.

The remaining views of the apparatus are all cross sectional views and are enlarged with reference to Figs. 1A, 1B and 1C:

Fig. 2 is a cross sectional view taken substantially on line 2—2 of Fig. 1A showing beveling rolls.

Fig. 3 is a sectional view taken substantially on line 3—3 of Fig. 1A showing a guide die.

Fig. 4 is a sectional view taken substantially on line 4—4 of Fig. 1A showing the first forming rolls.

Fig. 5 combines three sectional views showing the first set of guide rolls with associated shaping rolls taken substantially on section lines a—a, b—b and c—c of Fig. 1A.

Fig. 6 is a sectional view taken substantially on line 6—6 of Fig. 1A showing the second forming rolls.

Fig. 7 combines three sectional views of the second set of guide rolls and associated shaping rolls taken substantially on section lines d—d, e—e and f—f of Fig. 1B.

Fig. 8 is a sectional view taken substantially on line 8—8 of Fig. 1B showing the third forming rolls.

Fig. 9 is a view combining three cross sectional views showing the third set of guide rolls and associated shaping rolls taken substantially on section lines g—g, h—h and i—i of Fig. 1B.

Fig. 10 is a view taken substantially on line 10—10 of Fig. 1C showing the fourth forming rolls.

Fig. 11 is a view combining four cross sectional illustrations of a set of shaping rolls taken substantially on section lines j—j, k—k, l—l and m—m of Fig. 1C.

Fig. 12 is a sectional view taken substantially on line 12—12 of Fig. 1C showing the sizing rolls and arbor.

Fig. 13 is a cross sectional view of the finished tube.

The strip stock from which the tube is made may initially be of substantially flat form, the stock being illustrated at 1, and it is ultimately fashioned into plural ply tubular form as shown in Fig. 13, where it will be noted the tube has an outer ply 2, an inner ply 3, and an intermediate off-set 4 which lies between overlapping scarfed edges 5 and 6. The surfaces of the edges 5 and 6, considered together with the off-set 4, constitutes the seam structure. The strip may be fed to the machine from a suitable roll or other supply, and it is first fed through a guide 9 and then between beveling rollers 10 and 11 which cooperate with each other to apply pressure and bevel the edges as shown at 5 and 6 of Fig. 2. With the edges thus beveled, the tube may pass through a guide die 12. The strip may now pass to the first pair of forming rolls 13 and 14. One roll such as the roll 14 fits within the roll 13 and a relatively abrupt bend is placed in the stock adjacent one edge as is shown at 15. To this end the roll 13 has an exterior flange 16 which overlaps and abuts against the outside of the bent portion. The opposite edge of the stock is given an initial curvature as illustrated. This transverse curvature is preferably such that it may be engaged and acted upon by shaping rolls.

The strip may now pass between guide rolls, of which there may be a suitable number in a set as shown in Figs. 1A and 5. As illustrated, there are three pairs of guide rolls in this set, namely, rolls 20 and 21, rolls 22 and 23, and rolls 24 and 25. As will be seen by reference to Fig. 5, the guide rolls engage opposite sides of the strip and engage the bent portion on opposite sides to thus accurately guide the strip in its lengthwise movement. Shaping rolls may cooperate with these guide rolls, such for example, as the shaping roll 26 and shaping roll 27, both of which continue the forming action.

A suitable mandrel is introduced to the strip before the tubular form has progressed too far, and as shown in Figs. 1A and 5, this mandrel is introduced at about the location of the guide rolls 22 and 23. The mandrel is illustrated at 28 and it is held by a suitable bracket 29. The strip now passes between the second pair of forming rolls 30 and 31 which not only guide the bent formation 15 but which also continues the rolling of the strip into tubular form. It will be understood that the mandrel is of smaller diameter than the internal diameter of the tube and performs no function insofar as the forming of the strip is concerned, except at its arbor portions later to be described.

The strip now passes through the second set of guide rolls of which there may be a suitable number of pairs, and including a pair of guide rolls 32 and 33, a pair 34 and 35, and a pair 36 and 37. These guide rolls, as shown in Fig. 7, engage the strip and the bent portion 15 to accurately guide the strip, and in conjunction with the guide rolls are shaping rolls 38, 39 and 40 which progressively continue the formation of the tube.

The strip now passes to a third pair of forming rolls 41 and 42 where the formation of the tube is continued and where also the strip is guided. Following these forming rolls, the strip passes through another set of guide rolls, of which there may be a desired number of pairs, for example, rolls 44 and 45, rolls 46 and 47, and 48 and 49, all of which engage and guide the tube as shown in Fig. 9 through the means of the bent edge and in conjunction with which shaping rolls 50, 51 and 52 continue with the progressive formation of the tubular form.

With the strip thus fashioned it passes through a fourth pair of forming rolls 55 and 56 where the progressive formation of the tubular structure continues, but at this location the shape of the preliminarily formed edge 15 is modified to give the edge a curvature as shown at 15a on a radius substantially that of the outer ply of the tube. The rolls 55 and 56 are properly shaped for this purpose as shown in Fig. 10. It will be observed that the edge 15 retains its preliminary shape until after the opposite edge of the strip has been fashioned into a complete tubular form, or in other words, fashioned through at least or more than 360°.

The stock is now passed through a set of shaping rolls which are also, in effect, guide rolls although not functioning upon a preliminarily shaped guiding formation. As shown in Figs. 1C and 11 there are four pairs of such rolls, although the number may vary, the first pair being rolls 58 and 59, the second at 60 and 61, the third at 62 and 63, and the fourth pair at 64 and 65. These rolls substantially complete the forming operation.

The tubular form is now passed through final sizing rolls of which two pair are shown. The first pair are at 70 and 71, and the second pair at 72 and 73. Substantially on the center lines of these sizing rolls the mandrel is provided with enlarged portions 75 and 76 which serve specifically as arbors and against which the plies of the tube are compacted and compressed by sizing rolls. The two sets of sizing rolls may be substantially identical as may also be the arbor portions 75 and 76, authough their adjustment may be such that the rolls 72 and 73 apply a greater pressure than the rolls 70 and 71.

The finished tube is now in the form shown in Fig. 13, but, of course, the plies and seams are not yet united. This uniting of the seams and plies is preferably accomplished through the means of a heat treatment where a molten sealing metal serves to join the plies and parts in the seam, and this may be accomplished in a number of ways known to those versed in the art. The principal thought herein is to so fashion the strip that it will effectively maintain itself in the form shown in Fig. 13 prior to and during the sealing step.

As shown in Figs. 1A, 1B and 1C, the various forming rolls may and preferably are positioned on horizontal axes. Likewise the guide rolls are on horizontal axes, since the strip lies in the horizontal plane with the edge 15 turned upwardly. The shaping rolls which cooperate with the guide rolls are, accordingly, on vertical axes as are the shaping rolls shown in Fig. 11. Some of the rolls may be driven to aid in propelling the strip through the machine, and to this end the forming rolls, as well also as the beveling rolls and final sizing rolls, may be driven, while the guide rolls and shaping rolls may be idlers. The terms "forming rolls," "guide rolls" and "shaping rolls" are used herein for the purpose of clarity to distinguish them from each other, and it is to be understood that these terms are not to be construed in a limiting fashion. Moreover, while the strip moves in a horizontal plane with the rolls positioned on axes as above mentioned, it is, of course, feasible to vary the arrangement in this regard.

The turning up of one edge of the strip to provide the preliminary guiding formation prevents twisting of the tube as it is formed, and one result of this is that the seam is accurately positioned on the top of the tube when it reaches the final sizing rolls 70, 71, 72 and 73. Thus the seam is positioned in the bottom of the groove of the adjacent sizing roll and at the location where the greatest pressure is applied. The seam is thus prevented from shifting to the side of the tube where it would be wiped by the sides of the sizing roll groove, which friction may tend to open the seam. Furthermore, the formation of the tube in this manner protects the initially beveled edges and permits as well the rolling or forming of the strip from one edge. It will be observed that as the various sets of shaping rolls act upon the strip in the progressive rolling action, referring now to the shaping rolls shown in Figs. 5, 7 and 9, a considerable lateral pressure is applied to the stock. The engagement of the upturned part 15 between guide rolls reacts against this pressure. This reactance, however, is not delivered through the beveled edge which might otherwise be deformed. The preliminarily formed part 15 presents an abrupt surface which butts up against the guide rolls, and the guide rolls engage opposite sides of the stock to prevent the stock from buckling under the lateral pressure. So it is that the beveled edge 5 is not called upon to resist any forces and retains its original shape up to the time it reaches the final sizing rolls. Likewise, beveled edge 6 is undisturbed as the first set of forming rolls 13 and 14 give to the strip a sufficient curvature so that the lateral pressure exerted by the first shaping roll 26 of Fig. 5 is not delivered directly to the beveled edge.

I claim:

1. The method of making plural ply tube from a strip of metal which comprises, moving the strip lengthwise, turning one edge of the strip on a relatively sharp bend so that it is at substantially a right angle to the plane of the main body of the strip, guiding the strip in its movement by said turned edge, progressively fashioning the strip into tubular form by a rolling-like action starting at the opposite edge with the reaction to the fashioning forces taken by the preliminary formation, reshaping the turned up edge to give the bend a radius comparable to the radius of the outer ply of the resultant tube, and then fashioning the remaining portion of the strip adjacent the first mentioned edge around the already fashioned tubular form to complete the outer ply.

2. The method of making plural ply tube from a strip of metal which comprises, moving the strip lengthwise, turning one edge of the strip on a relatively sharp bend so that it is at substantially a right angle to the plane of the main body of the strip, guiding the strip in its movement by said turned edge, progressively fashioning the strip into tubular form by a rolling-like action starting at the opposite edge with the reaction to the fashioning forces taken by the preliminary formation, reshaping the turned up edge to give the bend a radius comparable to the radius of the outer ply of the resultant tube, fashioning the remaining portion of the strip adjacent the first mentioned edge around the already fashioned tubular form to complete the outer ply, and then subjecting the tubular form to compressive forces to place the plies and seam in close contiguous relationship.

3. The method of making plural ply tube from a strip of metal which comprises, moving the strip lengthwise, placing a preliminary abrupt substantially right angular bend adjacent one edge of the strip, guiding the strip in its movement by bent edge, progressively fashioning the strip into tubular form by a rolling-like action starting at the opposite edge with the fashioned parts on the same side of the strip as the bent edge, the reaction to the fashioning forces being taken by the bent edge, guiding said strip by said bent edge to hold the strip from lateral displacement and twisting, whereby the longitudinal seam in the resultant tube is maintained in a definite position, reshaping the preliminary bend, fashioning the reshaped portion and adjacent metal around the tubular form to complete the outer ply, and then passing the tube through compression rolls disposed on axes which are substantially at right angles to a plane passing diametrically and longitudinally through the tube and the seam.

4. An apparatus for making plural ply tube from a longitudinally moving strip of metal comprising, means for turning one edge of the strip to a position at substantially a right angle to the body of the strip, guiding means for engaging said turned edge to guide the strip in its movement, means acting upon the strip from its opposite edge to progressively fashion the metal into tubular form with a rolling-like action, said guiding means acting through said turned up edge and taking the reaction to the fashioning forces, means for reshaping the abrupt formation into a form adapted to be fashioned into part of the outer ply of the tube, means for fashioning the reshaped portion around the said tubular form to complete the outer ply of the tube, and means for subjecting the tubular form to compressive forces to position the plies and seam in close contiguous relationship.

5. A tube mill for fashioning plural ply tube from a strip of metal stock comprising, rolls for placing an abrupt substantially right angular bend in the strip adjacent one edge, a plurality of successively positioned guide rolls for engaging the bent edge, a plurality of forming or shaping rolls arranged successively substantially with the guiding rolls for acting upon the opposite edge of the strip to fashion the same into tubular form with rolling-like action, rolls for reshaping the abrupt bend on a radius so that it is adapted to be placed around the tubular form, and shaping rolls for fashioning the reshaped formation and metal thereabouts around the tubular form to complete the outer ply.

6. A tube mill for fashioning plural ply tube from a strip of metal stock comprising, rolls for placing a preliminary abrupt formation in the strip adjacent one edge, a plurality of successively positioned guide rolls for engaging the preliminary formation, a plurality of forming or shaping rolls arranged successively substantially with the guiding rolls for acting upon the opposite edge of the strip to fashion the same into tubular form with rolling-like action, rolls for reshaping the preliminary formation into a form so that it is adapted to be placed around the tubular form, shaping rolls for fashioning the reshaped formation and metal thereabouts around the tubular form to complete the outer ply, a swimmer about which the tubular form is freely fashioned, said swimmer having an enlarged arbor portion, and compression rolls disposed at the location of the said arbor portion for compressing the tubular form.

7. A tube mill for fashioning plural ply tube from a strip of metal stock comprising, a series of guiding and forming rolls, some of which are driven, and including, rolls for bending one edge of the strip upwardly at substantially a right angle, a series of successively arranged guide rolls for engaging the said edge to guide the strip in its movement, a series of fashioning rolls arranged along with the guide rolls for acting upon the opposite edge of the strip successively to fashion the strip into tubular form with a rolling-like action, rolls for reshaping the said bend onto a radius and to fashion the seam and metal thereabouts around the tubular form to complete the outer ply, with the extreme edge thereof definitely located in a seam on the top of the tube, and compression means including grooved compression rollers disposed on horizontal axes, whereby the seam of the tube is located substantially in the deepest portion of the groove of one of the compression rollers.

ERICH O. WOELLER.